United States Patent

[11] 3,577,787

| [72] | Inventors | Burkhard Schmidt;<br>Reinhold Nibbrig, Wilhelmshaven,<br>Germany |
|---|---|---|
| [21] | Appl. No. | 878,371 |
| [22] | Filed | Nov. 20, 1969 |
| [45] | Patented | May 4, 1971 |
| [73] | Assignee | Olympia Werke AG<br>Wilhelmshaven, Germany |
| [32] | Priority | Nov. 26, 1968 |
| [33] | | Germany |
| [31] | | P 18 10 969.8 |

[54] ADJUSTABLE FRICTIONAL CONNECTION
15 Claims, 9 Drawing Figs.

[52] U.S. Cl........................................................ 74/522,
74/531
[51] Int. Cl........................................................ G05g 1/04
[50] Field of Search........................................... 74/522,
525, 524, 531

[56] References Cited
UNITED STATES PATENTS
935,176  9/1909  Thompson.................. 74/522UX

*Primary Examiner*—Milton Kaufman
*Attorney*—Michael S. Striker

ABSTRACT: Two members having abutting surface portions are pressed into frictional engagement by rivet means so the relative position of the members can be adjusted by overcoming the friction. The adjustment is effected by a tool inserted into a bearing opening of one of the members and effecting displacement of the other member. A rivet passes through a camming slot in one of the members, and through a bore in the other member, and by displacing the rivet in the camming slot, the adjustment is effected. The camming slot is slanted prevents undesired relative adjustment of the two members.

Patented May 4, 1971
3,577,787
2 Sheets-Sheet 1
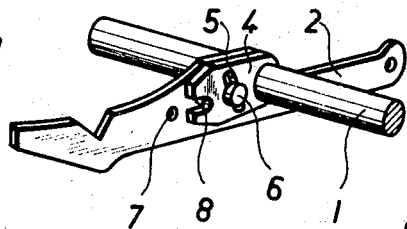
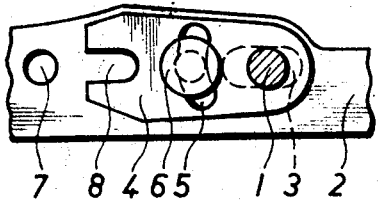
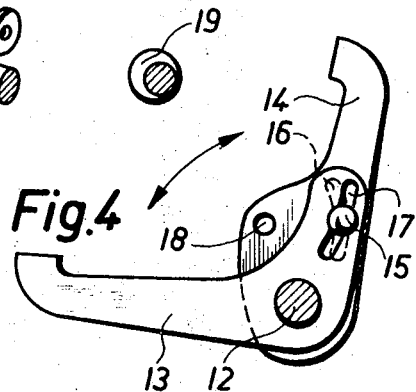
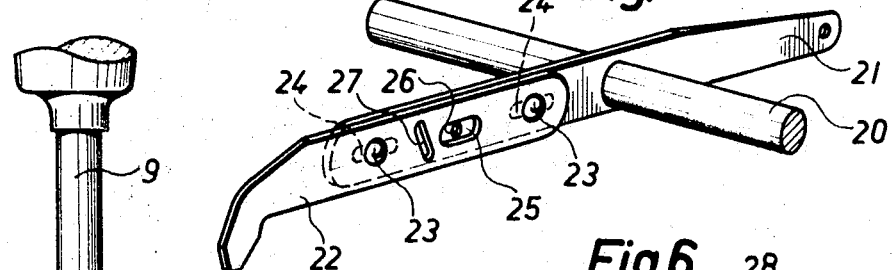
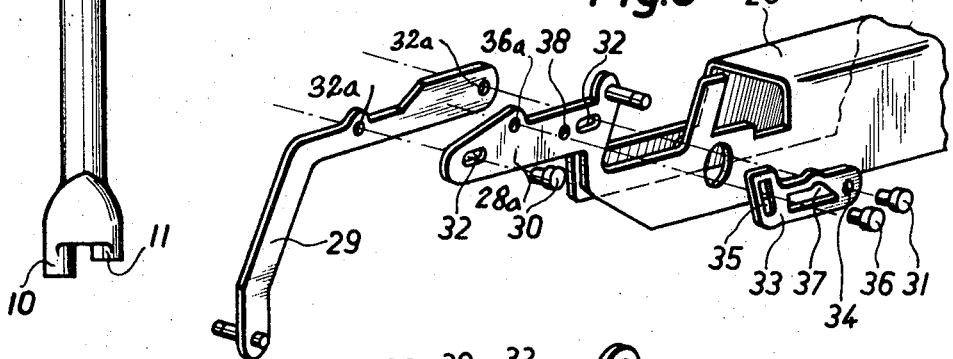
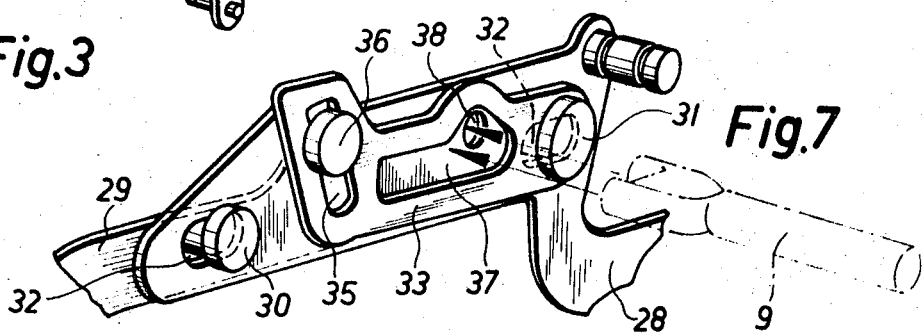
INVENTOR
BURKHARD SCHMIDT
REINHOLD NIBBLIG
BY:
ATTORNEY

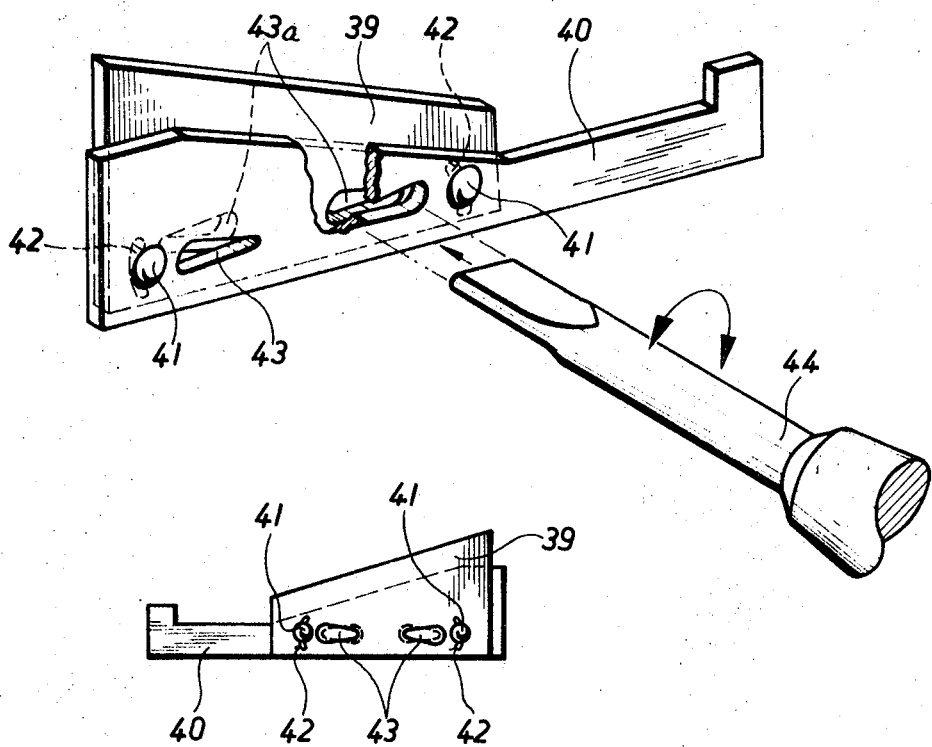

3,577,787

ADJUSTABLE FRICTIONAL CONNECTION

BACKGROUND OF THE INVENTION

It is frequently necessary to adjust mechanical members in relation to other members, particularly when the members are supported on supporting means consisting of a molded synthetic material which requires great tolerances.

It is common practice to connect mechanical members which have to be adjusted relative to each other by screw connections. When two members are adjusted, the screws have to be loosened, the relative position of the members adjusted to the desired position, whereupon the screws are tightened again. This adjusting operation is time-consuming and expensive since threaded bores, screws, washers, and counter nuts are required.

SUMMARY OF THE INVENTION

It is one object of the invention to overcome the disadvantages of the prior art, and to provide an adjustable frictional connection which is easy to assemble and adjust, and which is inexpensively manufactured.

Another object of the invention is to provide an adjustable frictional connection which is locked in the adjusting direction, and can be adjusted by moving a part transversely to the adjusting direction.

Another object of the invention is to obtain an adjustable frictional connection by rivets passing through openings and slots of two connected members.

With these objects in view, the present invention provides two abutting means connected by a rivet passing through a slot in one of the abutting means, and engaging both abutting means for frictionally connecting the same with each other so that the two abutting means are adjustable when the friction is overcome.

Preferably, an adjusting tool is used which has a part inserted into a bearing bore in one of the abutting means and has another part engaging a cutout in the other abutting means, or the head of the rivet so that turning of the tool results in the adjustment without requiring the disassembly of the parts. The use of rivets assures a very secure connection of the adjustable parts, which is resistant even to very strong jolts and vibrations. It is possible to provide two frictionally connected members which are adjusted in a straight adjusting direction, or which can be turned relative to each other. Very little space is required for the frictional connection according to the invention.

In one embodiment of the invention two abutting members are guided for straight movement in adjusting direction by a pair of rivets secured to one of its members and passing through slots of the other member extending in the adjusting direction. When one part of a tool is inserted into a bearing bore of the slotted member, and another part of the tool is inserted into a camming slot in the rivet carrying member which extends transverse to the adjusting direction, turning of the tool effects the adjustment.

A preferred embodiment of the invention comprises two abutting means, one having a camming slot transversely slanted to a predetermined adjusting direction, and the other having an opening at least a portion of which registers with a portion of the camming slot; and rivet means passing through the registering portion and pressing the abutting surface portions into frictional engagement. As a result, undesired relative movement of the abutting means in the adjusting direction is blocked by the rivet means and by the camming slot. Nevertheless, the relative position of the abutting means can be adjusted in the adjusting direction by moving the rivet means and the camming slot relative to each other.

Such movement is preferably effected by a tool inserted into a bearing element for turning movement and having a portion engaging either the other abutting means or the rivet means for effecting relative movement between the cam slot and the rivet means when the tool is turned.

The slant of the camming slot, which may be straight or curved, relative to the direction of adjustment, is selected so that the connection between the rivet and the camming slot is self-locking which means that pulling apart of the two abutting means in the adjusting direction, cannot effect sliding of the rivet in the camming slot, even if the force tending to displace the abutting means is greater than the friction force produced by the pressure of the rivet.

In some embodiments of the invention, the rivet means is secured to the abutting means which does not have the camming slot. In another embodiment of the invention, the camming slot in one abutting means crosses another slot in the other abutting means, and the rivet passes through both slots and is movable in the same. The other slot is preferably part-circular and concentric with a bearing bore in which the tool is inserted so that another part of the tool engaging the head of the rivet means effects the relative displacement, for example an angular displacement of two levers mounted on a shaft.

In another embodiment of the invention a third abutting means is provided for obtaining the self-locking by the rivet and camming slot.

In another embodiment of the invention a screwdriver is used as adjusting tool, and is inserted into pear-shaped openings in both abutting means so that angular and straight adjustment of the position of the two abutting means is possible.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a perspective view illustrating the embodiment of the invention in which the position of a lever is adjusted in a direction radial to a shaft;

FIG. 2 is a fragmentary side view, partially in section, of the embodiment of FIG. 1;

FIG. 3 is a front elevation illustrating a tool which is advantageously used for adjusting frictional connections in accordance with the invention;

FIG. 4 is a side elevation, partially in section, illustrating another embodiment of the invention permitting angular adjustment;

FIG. 5 is a perspective view illustrating another embodiment of the invention in which two abutting parts are adjusted in longitudinal direction by the tool of FIG. 3;

FIG. 6 is a perspective exploded view illustrating another embodiment of the invention;

FIG. 7 is a fragmentary perspective view illustrating a portion of the embodiment of FIG. 6 on a larger scale;

FIG. 8 is a perspective view illustrating another embodiment of the invention; and FIG. 9 is a rear view illustrating the frictional connection of FIG. 8 on a reduced scale.

DESCRIPTION OF THE PREFERRED EMBODIMENTS

Referring first to FIGS. 1 and 2, a shaft 1 passes through a slot 3 in a lever 2 so that the same is mounted on shaft 1 for radial and turning movement. Lever 2 may be, for example, a spring biassed arresting lever whose exact position in relation to shaft 1 is to be adjusted.

A small plate 4 has a bearing bore through which shaft 1 passes so that plate 4 is turnable about shaft 1. A camming slot 5 is provided in plate 4 which may be straight or curved, as illustrated, but must be eccentric to the axis of shaft 1 and slanted to the adjusting direction of lever 2. A rivet 6 passes through camming slot 5, and through a corresponding opening in lever 2 which register with each other. Rivet 6 has heads on opposite sides of plate 4 and lever 2, and is secured to lever 2, while being movable in camming slot 5. Due to the pressure of the rivet, plate 4 and lever 2 abut each other in frictional engagement.

Lever 2 has a bearing bore 7, and plate 4 has a cutout 8 opposite bearing bore 7. The tool 9 shown in FIG. 3 has a pivot part 10 which is inserted into the bearing bore 7 when adjustment is required. The other part 11 of a tool 9 is inserted into the cutout 8, and when the tool is turned about pivot 10, part 11 displaces a respective end of plate 4, turning the same about shaft 1, while the camming slot 5 moves relative to the rivet 6 so that lever 2 is displaced relative to shaft 1 which is possible due to the provision of the elongated guide slot 3 in lever 2.

The adjustment takes place in radial direction in relation to shaft 1, and due to the slanted and eccentric position of camming slot 5, the connection between the rivet 6 and slot 5 is self-locking, and pulling lever 2 in the adjusting direction cannot effect a relative displacement between the rivets and the camming slot so that the frictional connection is blocked by rivet 6 and camming slot 5.

In the embodiment of FIG. 4, the two abutting means are two levers 13 and 14 mounted on a shaft 12 and extending at an angle to each other. Lever 13 is fixed on shaft 12, and lever 14 is turnable on the same. Lever 13 has a camming slot 17, and lever 14 has another slot 16 which is curved and concentric to a bearing bore 18 in lever 14. Rivet 15 passes through registering portions of the crossing slots 16 and 17, and has heads pressing levers 13 and 14 into frictional abutment. A stop 19 limits angular movement of the frictionally connected levers in two end positions in which one or the other lever abuts stop 19 when the connected levers are turned by shaft 12. In order to determine the turning angle of the two stop levers 13 and 14, the relative position of the levers 13 and 14 has to be adjusted. This adjustment can be effected by moving the rivet 15 along the circular slot 16. When rivet 15 is moved upward as viewed in FIG. 4, the respective upper portion of camming slot 17 is pressed to the left so that lever 13 is turned in counterclockwise direction, and the angle between levers 13 and 14 is increased. When rivet 15 is moved downward in camming slot 17, a respective lower portion of the camming slot aligns with the lower portion of the part-circular slot 16 and lever 13 is moved in clockwise direction whereby the angle between levers 13 and 14 is reduced, and shaft 12 can be turned a smaller angle before one or the other lever engages stop 19 which is eccentric and turnable and can also be adjusted.

The above-described displacement of rivet 15 is carried out by a tool similar to the tool shown in FIG. 3. The portion 10 is inserted into bearing opening 18, and the portion 11 constructed as a seat for the head of the rivet 15 is placed on the head of the rivet so that turning of tool 9 effects the above-described displacement of rivet 15 along the part-circular slot 16 which is concentric with the turning axis of the tool.

It is not possible to move levers 13 and 14 toward or away from each other about the axis of shaft 12, since the substantially radial camming slot 17 is transverse and slanted to the circumferential direction of movement of the levers, and prevents relative angular movement of the levers by forces acting on the same.

In the embodiment of FIG. 5, a shaft 20 carries a lever 21 for angular movement. An extension piece 22 is mounted on one arm of lever 21 for adjusting movement in the longitudinal direction of the same. Lever arm 21 has two aligned guide slots 24 registering with openings in extension piece 22, and rivets 23 pass through the respective openings and guide slots 24 and press extension piece 22 and lever 21 into frictional abutment so that friction forces have to be overcome for displacing extension piece 22 along lever 21.

Extension piece 22 has an opening or cutout 25 with which a bearing bore 26 in lever 21 registers, and is formed with a slot 27 slanted to the direction of adjustment of lever 21 and extension piece 22.

When the journal portion 10 of a tool 9 is inserted through the opening 25 into the bearing bore 26, and the other part 11 of the tool is inserted into the camming slot 27, and the tool is turned, a component of the force acting on the edge of the camming slot 27 displaces extension piece 22 in the longitudinal adjusting direction. Turning of the tool 9 in clockwise direction effects shortening of the adjusted length, and turning of the tool in counterclockwise direction moves extension piece 22 outward and increases the length of the respective lever arm. The friction between the abutting faces of members 22 and 21 by the pressure of the rivets, is sufficient to hold the parts in the adjusted position since no pulling force acts on extension piece 22 in the longitudinal adjusting direction, and transverse forces are taken up by the rivets 23.

In the embodiment illustrated in FIGS. 6 and 7, a slide 28 has a connecting part 28a having two longitudinal slots 32 registering with openings 32a in an extension piece 29. Rivets 30 and 31 are fixedly secured in openings 32a and are guided in slots 32. River 30 has a head engaging slide portion 28a for pressing the same against the extension piece 29 in frictional abutting engagement. Rivet 31 has the same effect, but it also passes through an opening 34 in an adjusting plate 33 and has a head pressing the same against slide portion 28a and another head pressing extension piece 29 against the other side of slide portion 28a. In this manner, extension piece 29 is frictionally connected with slide portion 28a for an adjusting movement in the direction of slots 32, similar to the construction described with reference to FIG. 5.

The adjusting plate 33 has a camming slot 35 transverse and slanted to the direction of adjusting movement of the extension piece 29. Since rivet 31 connects the adjustment plate with the extension piece 29, the same moves together with adjusting plate 33 in the direction determined by the slots 32.

A third rivet 36 passes through the camming slot 35 and is secured to an opening 36a in slide portion 28a.

Adjustment plate 33 has an elongated cutout 37 with which a bearing opening 38 in slide portion 28a registers. When the journal portion 10 of a tool 9 is inserted through cutout 37 into bearing opening 38, the tool portion 11 engages another part of the cutout 37, and turning of the tool effects turning of adjusting plate 33 about rivet 31 so that camming slot 35 is displaced relative to rivet 36 which is fixed in opening 36a of slide portion 28a so that adjusting plate 33 is displaced in the adjusting direction and moves through rivet 31 extension piece 29 in the same direction determined by slots 32. By turning of the tool in clockwise and counterclockwise directions, respectively, opposite displacements of the extension piece 29 can be obtained so that the distance of the free end of extension piece 29 from slide 28 is adjusted in accordance with the position of the element with which lever 29 cooperates.

Since the adjusting plate 33 is provided in addition to the extension piece 29, and has a camming slot transverse and slanted to the adjusting connection, it is not possible to displace extension piece 29 by pulling the same in the adjusting direction since rivet 36 blocks movement of adjusting plate 33. This is an advantage over the construction described with reference to FIG. 5 where a longitudinal pull in the adjusting direction is capable of frictionally sliding the extension piece on lever 21.

In the embodiment of FIGS. 8 and 9, the two abutting means 39 and 40 are connected to each ocher by rivets 41 passing through guide slots 42. Rivets 41 are fixedly secured to member 40, and guide slots 42 are part-circular and have centers respectively located in the respective other rivet 41.

Between rivet 41, two pear-shaped cutouts 43 are provided in member 40, and two pear-shaped cutouts 43a are provided in member 39. Cutouts 43a and 43 respectively register, but are displaced an angle of 180°.

A screwdriver 44 may be used as adjusting tool, and is inserted into registering cutouts 43 and 43a. When the tool 44 is turned, it acts on the edges of the left cutout 43a, for example, so that member 39 is turned about rivet 41 on the right as viewed in FIG. 8, the slot 42 on the left permitting such angular displacement. When the tool 44 is inserted into the other registering pair of cutouts 43 and 43a on the right as viewed in the drawing, and turned, member 39 turns about rivet 41, while the slot 42 on the right moves relative to rivet 41 on the right. While each above-described operation effects an angular adjustment between members 39 and 40, member 39 can be adjusted while remaining parallel to member 40 when both angular adjustments are successively carried out to the same degree.

If only an angular adjustment is desired, one pair of registering cutouts 43, 43a can be omitted, and instead of the respective part-circular slot 43 a cylindrical bore provided for the respective rivet 41.

It will be understood that each of the elements described above, or two or more together, may also find a useful application in other types of adjustable connections differing from the types described above.

While the invention has been illustrated and described as embodied in two abutting means having a camming slot and an opening, respectively, through which a rivet passes, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention.

What is claimed as new and desired to be protected by Letters Patent is set forth in the appended claims.

We claim:

1. Adjustable frictional connection comprising two abutting means having abutting surface portions, one of said abutting means having a camming slot transversely slanted to a predetermined adjusting direction, and the other abutting means being formed with an opening at least a portion of which registers with a portion of said camming slot; and rivet means passing through said registering portions and pressing said abutting surface portions into frictional engagement so that undesired relative movement of said abutting means in said adjusting direction is blocked by said rivet means and camming slot, and so that the relative position of said abutting means can be adjusted in said adjusting direction by moving said rivet means and said camming slot relative to each other.

2. Adjustable frictional connection as claimed in claim 1 wherein one of said abutting means has a bearing element for supporting a tool for turning movement so that a turning portion of the tool engaging another means of said means effects relative movement between said camming slot and said rivet means.

3. Adjustable frictional connection as claimed in claim 1 wherein said rivet means is secured in said other abutting means.

4. Adjustable frictional connection as claimed in claim 3 wherein said opening in said one abutting means is a slot crossing said camming slot and having a portion registering with said camming slot; and wherein said rivet means is movable in both said slots.

5. Adjustable frictional connections as claimed in claim 1 wherein said other abutting means has a guide slot extending in said adjusting direction; wherein said rivet means is secured to said one abutting means; comprising a shaft turnably mounting said one abutting means and passing through said guide slot so that by turning of said one abutting means about said shaft said cam slot is displaced relative to said rivet means whereby said other abutting means is adjusted relative to said shaft.

6. Adjustable frictional connection as claimed in claim 5 wherein said one abutting means is a plate having one end turnably supported on said shaft, an other end formed with a cutout; wherein said camming slot is curved eccentrically to said shaft and located between said ends; and wherein said other abutting means is a lever having a bearing bore spaced from said cutout so that a tool inserted and turned in said bearing bore engages said cutout and turns said plate about said shaft for adjusting the position of said lever relative to said shaft.

7. Adjustable frictional connection as claimed in claim 1 wherein said opening in said other abutting means is an other slot crossing said camming slot and having a portion registering with the same; wherein said rivet means is movable in both said slots and passes through said registering portion; comprising shaft means supporting said one and said other abutting means for relative turning movement about an axis in a circumferential adjusting direction; and wherein said camming slot is eccentric to said axis and transversely slanted to said circumferential adjusting direction.

8. Adjustable frictional connection as claimed in claim 7 wherein said one and said other abutting means are first and second levers, respectively, said first lever being fixed to said shaft means and said second lever being mounted for turning movement on said shaft means; and comprising a stop between said first and second levers so that the turning angle of said levers and shaft is different in different adjusted positions of said levers.

9. Adjustable frictional connection as claimed in claim 8 wherein said second lever has a bearing bore; and wherein said other slot in said second lever is concentric with said bearing bore so that a tool inserted and turned in said bearing bore and engaging said rivet means displaces said slots and levers relative to each other for adjusting the relative angular position of said levers.

10. Adjustable frictional connection as claimed in claim 1 wherein said one abutting means is located on one side of said other abutting means, said other abutting means having two aligned guide slots extending in said adjusting direction; and comprising an extension piece located on the other side of said other abutment means and having two openings registering with said guide slots; comprising a first rivet passing through one of said guide slots and the respective opening, and a second rivet passing through said one abutting means, the other guide slot, and the other opening in said extension piece, and connecting said extension piece for movement with said one abutting means in said adjusting direction; and wherein said rivet means are fixedly connected with said other abutting means so that movement of said one abutting means in the direction of said camming slot with the same effects displacement of said one abutting means with said extension piece in said adjusting direction relative to said rivet means and said other abutting means.

11. Adjustable frictional connection as claimed in claim 10 wherein said one abutting means is an adjustment plate having a cutout bounded by edges; wherein said other abutting means is a slide portion having a bearing element for one part of a tool so that an other part of the tool engages one of said edges when turned and displaces said adjusting plate with said camming slot relative to said rivet means so that said extension piece is displaced in said adjusting direction relative to said other abutting means.

12. Adjustable frictional connection comprising first and second abutting means having abutting surfaces, at least one of said abutting means having guide slots aligned in an adjusting direction, and the other abutting means having openings registering with said guide slots, respectively; first and second rivet means passing through said registering guide slots and openings, respectively, and pressing said abutting surfaces into frictional engagement, said first abutting means having a bearing element for supporting a tool for turning movement, and said second abutting means having a camming slot transverse and slanted to said adjusting direction and adapted to be engaged by a part of said tool so that turning of said tool effects relative movement of said first and second abutting means in said adjusting direction.

13. Adjustable frictional connection as claimed in claim 12 wherein said first abutting means is a lever having said guide slots, and said second abutting means is an extension piece having said camming slot; and wherein said extension piece has a cutout registering with said bearing element so that the tool can be inserted through said circuit into said bearing element; and wherein said bearing element is a bearing bore.

14. Adjustable frictional connection as claimed in claim 12 wherein said camming slot is pear-shaped; wherein said second abutting means has a pear-shaped cutout registering with said pear-shaped slot and being angularly displaced relative to the same an angle of 180°.

15. Adjustable frictional connection as claimed in claim 14 wherein each said guide slot is part-circular and has a center of curvature coinciding with the first and second rivet means located in the respective other guide slot; wherein said first abutting means has another pear-shaped slot; and wherein said second abutting means has an other pear-shaped cutout registering with said other pear-shaped slot and adapted for insertion of a tool.